(12) United States Patent
Paulsen et al.

(10) Patent No.: US 8,438,177 B2
(45) Date of Patent: May 7, 2013

(54) GRAPHICAL RESULT SET REPRESENTATION AND MANIPULATION

(75) Inventors: Andrew Paulsen, San Jose, CA (US); Christopher Crim, San Jose, CA (US); Ryan Griggs, San Jose, CA (US)

(73) Assignee: Apple Inc., Cupertino, CA (US)

( * ) Notice: Subject to any disclaimer, the term of this patent is extended or adjusted under 35 U.S.C. 154(b) by 637 days.

(21) Appl. No.: 12/343,255

(22) Filed: Dec. 23, 2008

(65) Prior Publication Data

US 2010/0161593 A1    Jun. 24, 2010

(51) Int. Cl.
*G06F 7/00* (2006.01)

(52) U.S. Cl.
USPC .......................................... 707/759; 707/722

(58) Field of Classification Search .................. 707/717, 707/722, 736, 759
See application file for complete search history.

(56) References Cited

U.S. PATENT DOCUMENTS

| | | | |
|---|---|---|---|
| 5,734,888 A * | 3/1998 | Li et al. ................................. | 1/1 |
| 5,933,145 A * | 8/1999 | Meek ............................ | 715/835 |
| 7,188,102 B1 * | 3/2007 | Gollapudi et al. ..................... | 1/1 |
| 7,761,450 B1 * | 7/2010 | Ordonez ........................ | 707/736 |
| 7,792,950 B2 * | 9/2010 | Barsness et al. ............... | 709/224 |
| 2003/0212669 A1 * | 11/2003 | Dedhia et al. ...................... | 707/3 |
| 2003/0229677 A1 * | 12/2003 | Allan ............................ | 709/217 |
| 2004/0078236 A1 * | 4/2004 | Stoodley et al. ................... | 705/2 |
| 2007/0088685 A1 * | 4/2007 | Wilson et al. ...................... | 707/4 |
| 2007/0124676 A1 * | 5/2007 | Amundsen et al. ........... | 715/704 |
| 2008/0195643 A1 * | 8/2008 | Sheth-Voss et al. .......... | 707/101 |
| 2008/0222092 A1 * | 9/2008 | Hueske et al. .................... | 707/2 |
| 2008/0235181 A1 * | 9/2008 | Faunce et al. .................... | 707/2 |
| 2010/0036831 A1 * | 2/2010 | Vemuri et al. ..................... | 707/5 |

* cited by examiner

*Primary Examiner* — Pierre Vital
*Assistant Examiner* — Christopher J Raab
(74) *Attorney, Agent, or Firm* — Morrison & Foerster LLP

(57) ABSTRACT

A graphical user interface in a database application includes a control for manipulating a result set of a query. The control is operable to display multiple graphical representations of a result ratio between a total number of rows in a database table returned in response to the query and a total number of rows of the database table. By interacting with the control, the user can switch (e.g., toggle) between graphical representations of the result ratio. The toggling can be achieved by automatically creating supplemental queries to the database. The graphical representations can be a pie chart, bar chart, eye chart or any other graphical representation that is suitable for displaying the result ratio.

45 Claims, 7 Drawing Sheets

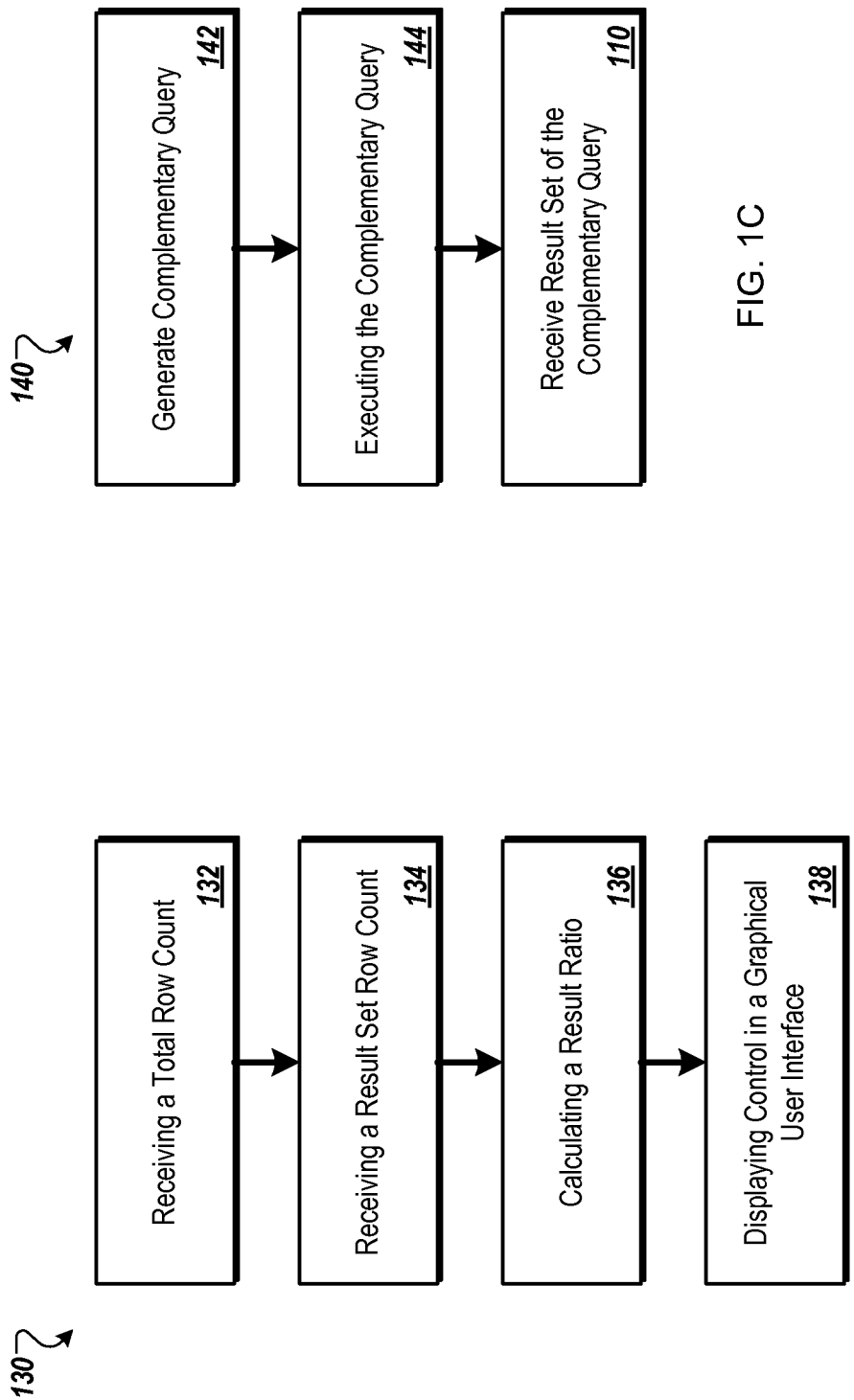

GRAPHICAL RESULT SET REPRESENTATION AND MANIPULATION

TECHNICAL FIELD

This subject matter relates to database query result display and manipulation.

BACKGROUND

Many modern database programs integrate a relational database engine and a graphical user interface (GUI). The GUI can allow a user to create, modify, and view tables in a database by clicking, dragging, and linking graphical objects on a display device. One or more query statements can be created by a backend software component, such as a query builder. The query statements can be passed to the database engine, and executed in the database engine. Result sets of the query statements can be passed back to the GUI. The result sets can be displayed graphically after being formatted by a software component, such as a result processor. The database program can thus provide tools to a database user to enable a database user to utilize complex database features without detailed knowledge of a database engine.

In addition to database programs with integrated GUI, many modern database application development tools contain a GUI component. A database application, such as an enterprise Web publishing application, can be developed by information systems (IS) developers using a database application development tool with GUI. A database application development tool with GUI can allow an IS developer to create sophisticated applications without directly interacting with a database using standard database query languages such as SQL. The GUI component can be responsible for making a database application development tool easy-to-use, reliable, and capable of providing high-quality database publishing and reporting solutions.

Often, a database program user or an IS developer needs to use a GUI that contains dynamically generated controls. A dynamically generated graphical control is a control that does not have a fixed size, shape, or color. Instead, the size, shape, or color of a control can represent some information in a database without an explicit user request. The information can be a result ratio, i.e., a percentage of rows returned from query as against the total number of rows in a database table. Traditionally, showing a result ratio in a chart in a user interface requires complicated user manipulation. A user is required to construct multiple queries and create the chart by writing specialized procedures. Even so, the chart can only be a result, but not a control in a traditional database program or a database application development tool. Therefore, traditionally, it is difficult for a user to see a context of a set of records retrieved from a database. A solution is needed to allow a result ratio chart to be generated automatically, in order to provide the user with a context hinting that the set of records returned is a portion of the total set of records.

SUMMARY

A graphical user interface in a database application includes a control for manipulating a result set of a query. The control is operable to display multiple graphical representations of a result ratio between a total number of rows in a database table returned in response to the query and a total number of rows of the database table. By interacting with the control, the user can switch (e.g., toggle) between graphical representations of the result ratio. The toggling can be achieved by automatically creating supplemental queries to the database. The graphical representations can be a pie chart, bar chart, eye chart or any other graphical representation that is suitable for displaying the result ratio.

The details of one or more graphical result set representations and manipulations are set forth in the accompanying drawings and the description below. Other features, objects, and advantages of the techniques will be apparent from the description and drawings, and from the claims.

DESCRIPTION OF DRAWINGS

FIGS. 1A-1C are flowcharts illustrating an example process for graphical result set representation and manipulation.

Like reference symbols in the various drawings indicate like elements.

DETAILED DESCRIPTION

The descriptions below can apply to both a database program with a GUI component or a GUI based database application development tool. The descriptions can also apply to any database-backed application program. The database can be a relational database or other database that includes tables under a schema. The term "database program" will be used to refer to any computer program that provides a GUI to a database backend.

Figure 1A:
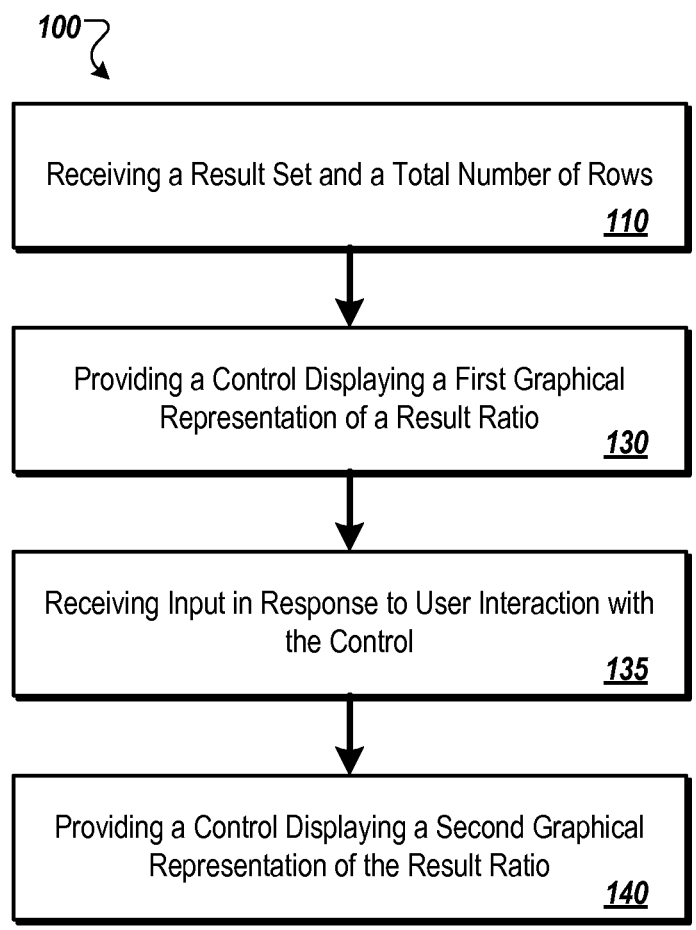

FIGS. 1A-1C are flowcharts illustrating an example process 100 for graphical result set representation and manipulation. FIG. 1A illustrates an overview of the example process 100. A database program receives a result set and a total number of rows from a database engine in step 110. The result set and the total number of rows can be acquired by one or more queries into the database engine. A database engine can contain a structured query language ("SQL") data source or any other database system. Some examples of SQL data sources are Microsoft® SQL Server 2000 and Microsoft® SQL Server 2005, Oracle® 9g and Oracle® 10g, or MySQL™ 5.0 Community Edition.

A user can manipulate graphical objects in a GUI on a display device to generate queries. Queries that retrieved the result set can be written in a query language that is compatible with the SQL data source. A query builder component in the database program can generate SQL statements based on user inputs in the GUI. An example user request can be retrieving rows from a database table. The user can instruct the query builder to create a query by manipulating graphical objects and links in the GUI. The user can select a database and a table, and specify select conditions. A query builder can generate a SELECT statement in response. In one example implementation, a query builder can generate underlying SQL statements in addition to a SELECT statement, even when a user's request can be satisfied by a simple SELECT statement. The SELECT statement can be a primary query, and additional queries can be supplemental queries. A primary query is a query that retrieves data according to a user's explicit request. A supplemental query can be queries generated automatically by the database program to retrieve extra information. Supplemental queries can include a summary query and a complementary query. A summary query can retrieve the total number of rows in a target table. A complementary query can invert a result set of a primary query. Supplemental queries are not required to be executed at the same time as the primary query.

For example, a query builder can generate two or more queries in response to a user's request to get salaries for employees whose employee ID is greater than 10,000 in an employee table. The user can make a request to a database in a GUI by, for example, visually selecting a table "employee table," a column "salary," and a condition "emp_id>10000. A query builder subsequently creates a primary query. The primary query can be "SELECT salary FROM employee table WHERE emp_id>10000." A query builder can also create a summary query. An example summary query can be "SELECT count(emp_id) FROM employee table." A query builder can also create a complementary query. An example complementary query can be "SELECT salary FROM employee table WHERE NOT (emp_id>10000)." The summary query and complementary query can be useful in a variety of situations described in the examples below.

In a next step 130, a control displaying a first graphical representation of a result ratio between a row count of the result set and the total number of rows is provided, together with at least a portion of a formatted result set is displayed in a GUI. The result set contains rows in a database that are retrieved by a primary query. The result set can be formatted by a formatter into a tabular format, containing rows and columns. For example, a result set can contain salary information for employees whose employee IDs are greater than 10,000. More than one result sets can return from a database when more than one database queries are executed. A result processor can process the result sets, e.g., by formatting the result sets into a displayable format.

In addition, in step 130, a result ratio is calculated and displayed in a graphical representation. A result ratio is a ratio between a number of rows in the displayed result set and a total number of rows in a database table. The details of step 130 will be explained below.

In a next step 135, a database program receives an input in response to user interaction with the control provided in step 130. The input can be a user action on the control as a whole. The input can also be a user action on a specified portion of the control. A user action can be, but is not limited to, clicking on a control, selecting a menu item that is a control, dragging a display item to a control, touching a control by a cursor, and gesturing on a control.

In a next step 140, the database program provides a control displaying another graphical representation of the result ratio. The other graphical representation of the result ratio can be a graphical representation of a complementary result ratio, which is a ratio between number of unselected rows and the total number of rows in a database table. The details of step 140 will be explained below FIG. 1B is a flowchart illustrating an example process 130 for providing a control displaying a first graphical representation of a result ratio. In a step 132, a database program receives a total count from a database table. In one example implementation, a total count can be received as a result of a summary query that is generated with the primary query and runs concurrently, or close in time, with a primary query. An example summary query can be in a format "SELECT COUNT(key) FROM . . . " In another example implementation, a total count can be received from a cached value in a result processor. A user is not required to build a query specifically to get a total count for the purpose of displaying a graphical representation of a result ratio.

In some example implementations, a query statement involves more than one database table in a database engine. For example, a SQL query can contain a join. A SQL join can be used to query data from two or more tables, based on a relationship between certain columns in these tables. In cases where a query involves more than one database table, a total number of rows can be generated from a "current" table. A current table can be identified in a query builder when the query builder creates queries from a user's graphical input. In one example implementation, a current table can be a first table identified in a query. In another example implementation, a current table can be a table that is identified by a user. In another example implementation, a current table can be a temporary table that a query builder builds as an intermediate step of generating queries from a user's in response to a user request from a GUI.

In some example implementations, a total count can differ from the actual total number of rows in a database table. For example, a user query can select only unique values from a database. Such a query can be in the format of "SELECT DISTINCT [column names] FROM . . . " In case where a user query selects unique values, a result ratio based on the total number of rows in a database table can be misleading. For example, a 500-row database can contain only two distinct values in a particular column, and only one of the distinct values satisfies a user's selection condition. In such cases, using 500 as a total count can lead to misleading graphical representation. Therefore, in one example implementation, a summary query can retrieve a total count of distinct values in a database (e.g., two, not 500, in the above example). An example of such a summary query can be in the format of "SELECT COUNT (DISTINCT column_name) FROM . . . "

In a next step 134, a database program receives a result count. A result count is a count from a result set of a primary query. In many database interfaces, a returned result set can be a data structure in the form of a count field and a collection of rows. The count field contains a number of rows of the data retrieved, and the collection of rows contains the actual result set. The collection can be a list, an array, or a set. Retrieving a count of result set in such database interfaces can include retrieving the count field. In some database interfaces, a returned result set can contain only a collection of rows, in the format of an array or list. A count of array or list elements can be achieved using conventional technology.

In a next step 136, a database program calculates a result ratio. A database program can calculate the result ratio by dividing the result count by the total count. In case the total count is zero, the result ratio can be specified to be zero.

In a next step 138, a database program displays a control in a graphical user interface. The control can be a control graph that can accept user input as well as display database information. A control graph can be a graphical representation of the result ratio. In some example implementations, a database program can generate a pie chart, a bar chart, an eye chart, or any other graphical representation suitable for displaying the result ratio. The graphical representation can be generated by a result processor, or by a GUI component.

In one example implementation, a control graph can be a pie chart. A pie chart can be created in a variety of ways. For example, a pie chart can be generated dynamically by a variety of available software libraries. For another example, a pie chart can be selected from a pre-created chart collection. A chart collection can contain pre-generated charts for a series of result ratios, e.g., 0%, 1%, 2%, . . . 99%, 100%. A series of result ratios can have an incremental amount of one percentage point, two percentage points, etc. An implementation using pre-created charts can have an advantage of reducing runtime dynamic graph generation, which leads to reduced load on computing resources during runtime. An implementation using pre-generated charts is feasible, because a graphical representation of a result ratio can be relatively small, and a difference of one or two percentage points may not be visually significant.

In another example implementation, a control graph can be created by manipulating part of an image file without generating the entire image file. For example, a control graph can be created by populating an image descriptor section of a GIF file. A Graphic Interchange Format ("GIF") file can contain varies sections, such as header, logical screen descriptor, global color table, image descriptor, etc. The image descriptor can describe the positions of image pixels in a graph. A database program can store data of a main body of a GIF file in memory. Based on a result ratio, a database program can calculate the pixel positions and modify the image descriptor section of the GIF file in memory accordingly. A resulting GIF file can be a chart representing a result ratio. Advantages of creating a chart by populating a data field in a GIF file can include fast and efficient program execution, reduced image size, and accurate rendering of a result ratio. It is understood that although GIF file is used in this example, files in other graphical file formats such as JPEG, TIFF, BMP, etc. can be manipulated in a similar manner to create a control graph.

In another example implementation, a control graph can contain a display text string. A display text string can be generated in association with the graphical representation. A display text string can include information such as the number of rows found and the total number of rows. The display text string can be implemented by using a string index in a string table. An advantage of implementing a string table is that text in the string table, when de-coupled from instructions in the database program, can be "localized," or translated to foreign languages, by existing localization tools.

After generating a graphical representation of a result ratio, a database program displays the generated graphical representation of a result ratio in a GUI component as a control. Displaying the generated graphical representation as a control can include plugging the chart into a display window as a control component. In one example implementation, a database program display window can contain display components generated by separate modules of the database program. A user interface manager can assemble the display components to create an integrated GUI view.

FIG. 1C is a flowchart illustrating an example process 140 for providing a control displaying a second graphical representation of the result ratio. In a step 142, a complementary query is generated. A complementary query can be a complementary SQL query of a primary query. A complementary query can return rows not selected by a primary query. In one example implementation, a query builder generates a complementary query by parsing a primary query. A complementary query can be created by inserting a "NOT" operator in a "WHERE" clause of a primary query and putting expressions in the "WHERE" clause of the primary query in parentheses. For example, if a primary query statement is "SELECT salary FROM employee_table WHERE employee_id>10000," a complementary query can be "SELECT salary FROM employee_table WHERE NOT (employee_id>10000)."

In another example implementation, a complementary query can contain a nested SQL query. For example, a primary query can contain a join of two or more tables. One of the two or more tables can be a current table as defined above.

The total row count in a current table is used to calculate a result ratio. A complementary query in the following format can retrieve rows in the current table that are not selected by a primary query:
SELECT column_list
FROM current_table WHERE key NOT IN
  [a SELECT statement containing a JOIN];

In yet another example implementation, a complementary query can contain multiple SQL statements to retrieve rows not selected by a primary query. For example, a primary query can contain a join of two or more tables. One of the two or more tables can be a current table as defined above. A query builder can create a query to retrieve the result set for the primary query, create another query to select all rows of the current table, and communicate the relationship between the two queries to a result processor. The result processor can get a first result set of a primary query, a second result set from the query returning all rows, remove the rows in the first result set from the second result set, leaving only rows not selected by the primary query in the remaining second result set. The remaining second result set can be formatted and displayed.

In a next step 144, a complementary query is executed. Once a complementary query is executed, the complementary query becomes a new primary query, and the original primary query becomes a complementary query of the new primary query. A result of a summary query, which contains a total count, can be cached on a result processor. The graphical representation of result sets is updated to reflect the result ratio based on result set from the new primary query.

In some example implementations, a query builder creates a lock on a database table after the execution of a primary and prior to the execution of a complementary query in step 144. A lock can prevent modifications of a database table that can change the number of rows. If a table is locked after the execution of a primary query, which returned, for example, 90 out of 144 rows, executing a complementary query can guarantee the return 54 of unselected rows, even when other database users attempt to update the table by, for example, inserting one more rows. An advantage of table locking can be that a user can see consistent data when the user toggles between displaying selected rows and displaying unselected rows.

In some other example implementations, no table locking is executed between the execution of a primary query and a complementary query. Some advantages of not implementing table lock can be allowing a user see most recent data, and permitting table modification during a user's viewing of the result set to prevent blocking out normal operations in the database.

In a next step 110, a database program receives a result set and a total number of rows from a data source, and the process can repeat until a user perform other operations on the application development program's user interface.

Example Displays

Figure 2A:
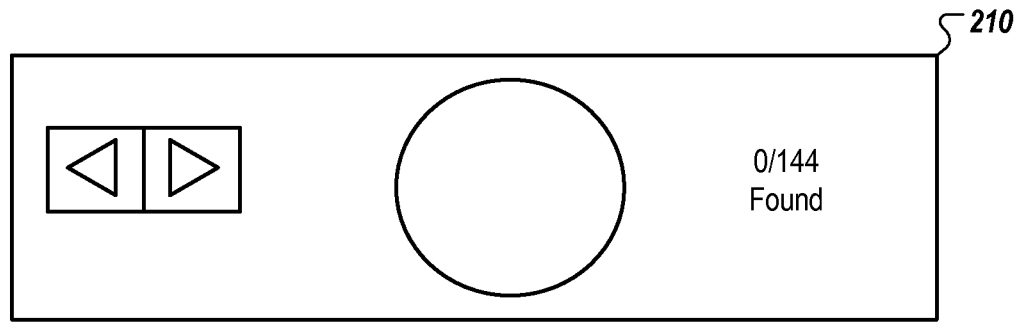
FIGS. 2A-2C are example displays of an example implementation of graphical result set representations.
Figure 2B:
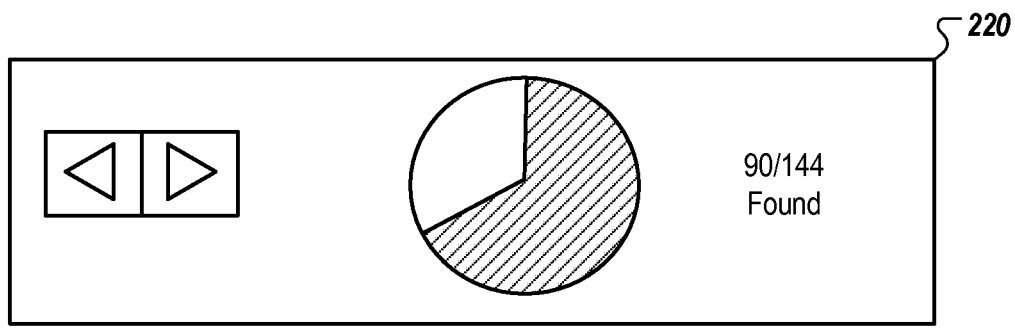
Figure 2C:
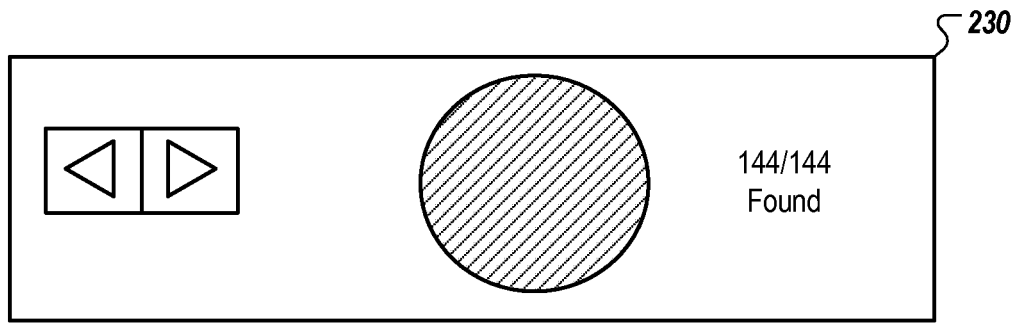

FIGS. 2A-2C are example displays of an example implementation of graphical result set representation. FIG. 2A shows an example control graph 210 in which a result ratio is zero. No row is retrieved by a primary query. In one example implementation, a graphical result set representation is a pie chart. A pie chart is a circular graph having radii dividing a circle into sectors that illustrate relative sizes of quantities represented. In a pie chart, an arc length, and consequently the area of a sector, is proportional to a quantity represented. In an example, the total number of rows in a database table is 144. The total rows in a result set is zero. Therefore, an arc length for a sector representing a result ratio is zero. The angular area of a sector representing total rows is the entire circle ($2\pi$). The angular area representing unselected rows in a table is $2\pi$. The angular range of the sector representing unselected rows in a table is $[0, 2\pi]$. Therefore, the pie chart is an entire circle in a color, a shade of grey, or a fill pattern that represents unselected rows in the database table.

FIG. 2B shows an example control graph 220 when some, but not all, rows in a table are retrieved by a primary query. Display 220 shows a result ratio when 90 rows are in a result set from a primary query, and a total number of rows in the database table is 144. Therefore, the radian angular range of the sector representing selected rows in the table can be $[-3/4\pi, 1/2\pi]$. The angular area of a sector representing selected rows in a table is $90/144*2\pi$. The area in the circle within the angular range $[-3/4\pi, 1/2\pi]$ can be in a color, or shade of grey, that represents selected rows. The angular range of sector representing unselected rows in the table can be $[1/2\pi, 5/4\pi]$. The area in the circle within the angular range of $[1/2\pi, 5/4\pi]$ can be in a color, a shade of grey, or a fill pattern that represents unselected rows.

It should be noted that the display 220 in FIG. 2B uses $1/2\pi$ as a fixed border between areas representing selected and unselected rows. That is, the area representing selected rows starts from $1/2\pi$ clockwise. In other implementations, a fixed border need not be at $1/2\pi$. For example, a fixed border can start from $\pi$. In yet some other implementations, a fixed border is not necessary. For example, $1/2\pi$ can be a midline of an area representing selected rows.

Figure 3A:
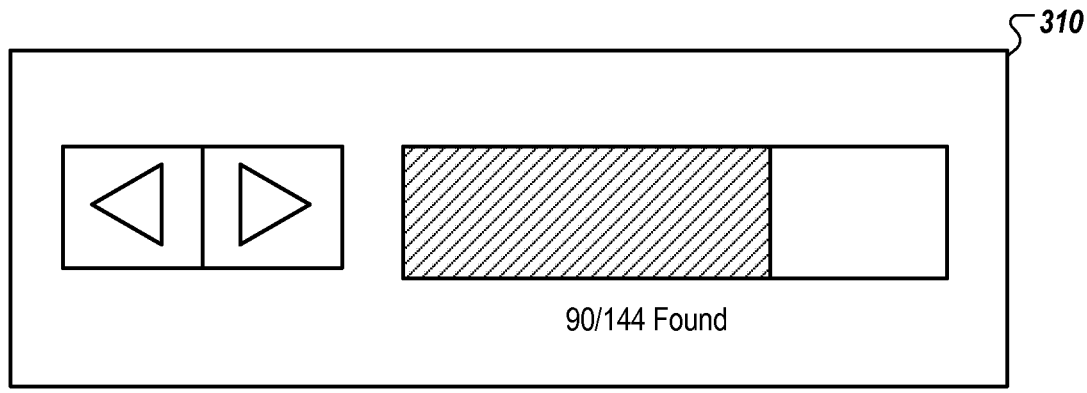
FIGS. 3A and 3B are example displays of two example implementations of graphical result set representations.
Figure 3B:
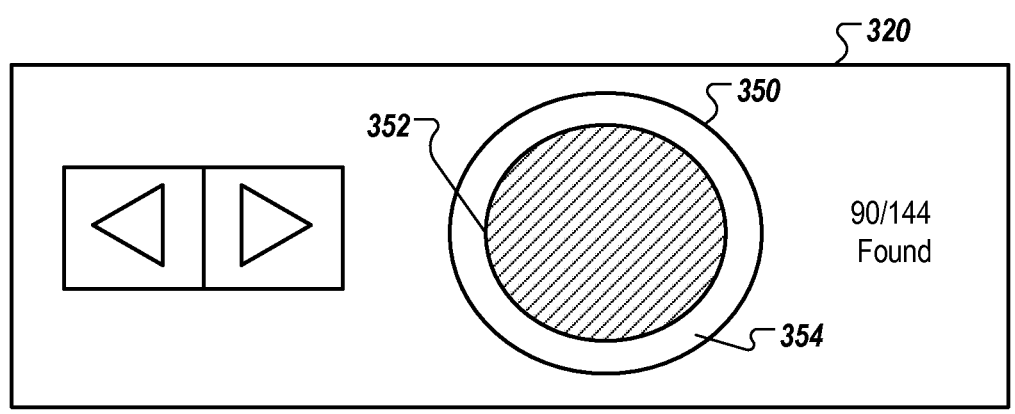

FIG. 2C shows an example control graph 230 when all rows in a table are retrieved by a primary query. In display 230, a result set of a primary query contains all rows in a table. Therefore, the area of the sector representing selected rows is 100% of the circular. The angular range of the area of the sector representing selected rows is $[0, 2\pi]$. Therefore, the pie chart is a full circle in a color, a shade of grey, or a fill pattern that represents selected rows in a database table FIGS. 3A and 3B are example displays of two example implementations of graphical result set representations. FIG. 3A shows an example control graph 310 when a result set ratio is represented by a bar chart. A bar chart is a chart that contains one or more rectangular bars, where the length of a rectangular bar is proportional to the value the bar represents. In one example implementation, a rectangular bar with a pre-determined length can be used to represent the total number of rows in a database table. The length can be specified in inches, millimeters, pixels, or a proportional size of a reference object. The reference object can be a screen width, screen height, display window width, display window height, etc. A proportional length of the rectangular bar can represent a result ratio. The proportional length of the rectangular bar can be in a color, or shade of gray, that represents a number of selected rows. Other part of the rectangular bar can be in a color, or shade of gray, that represents unselected rows. The rectangular bar can be displayed as horizontal or vertical component of a GUI.

FIG. 3B shows an example control graph 320 when a result set ratio is represent in an eye chart. An eye chart is a chart that includes concentric circles. An area of a circle is proportional to the data the circle represents. In an example implementation, a circle 350 has a predetermined unit area that represents the total number of rows in a database table. An inner-circle 352 has an area that represents the number of rows in a result set of a primary query. In an example, inner circle 352 has an area that is 90/144 of the area of circle 350. If circle 350 has a radius r, inner circle 352 can have a radius sqrt(10)/4 r. Inner circle 352 can have a color, a shade of gray, or a fill pattern that represents selected rows. Ring area 354, created by a difference between circle 350 and inner circle 352, can have a color, a shade of gray, or a fill pattern, that represents unselected rows.

Example Data Manipulation

Figure 4B:
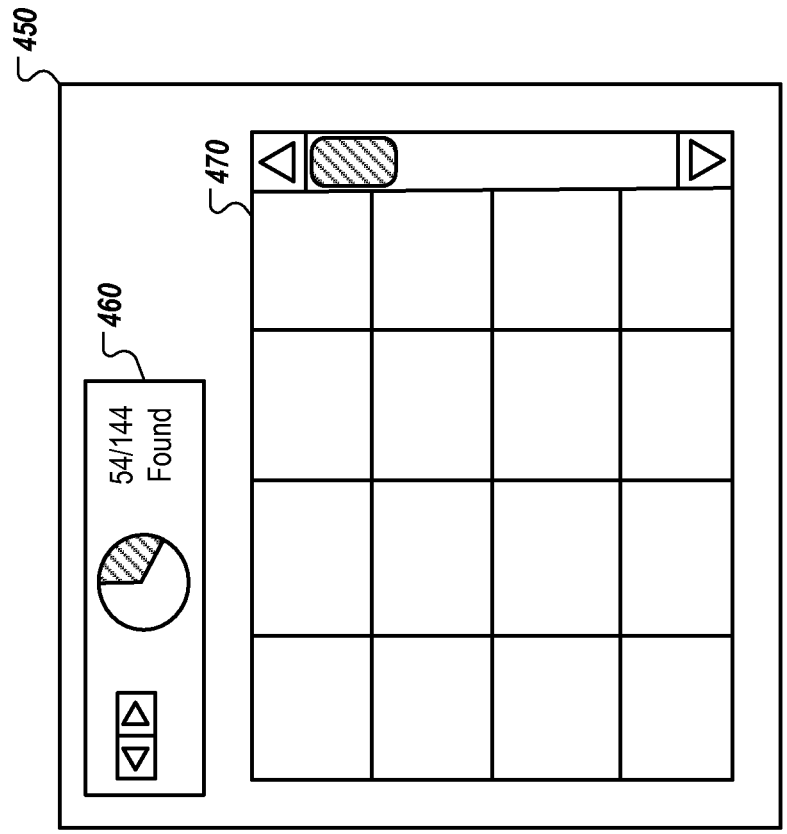
FIGS. 4A and 4B are example displays of graphical result set manipulation.
Figure 4A:
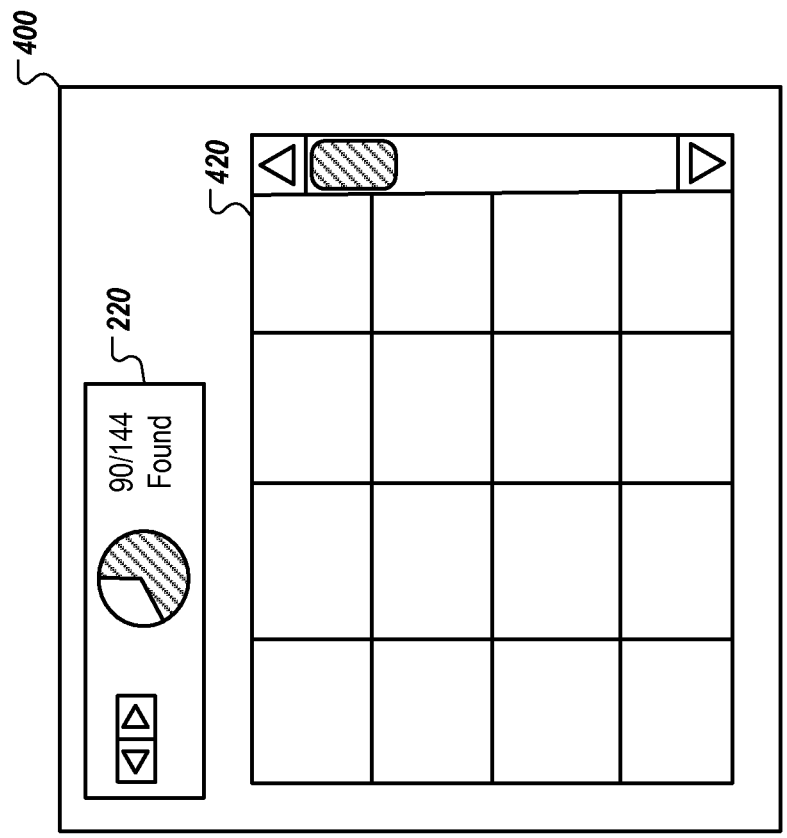

FIGS. 4A and 4B are example displays of graphical result set manipulation. FIG. 4A is an example display 400 of a result set from a primary query. In display 400, a graphical representation 220 of a result ratio is shown. Graphical representation 220 can contain a pie chart, which represents the result ratio. The pie chart can be one of many control components in a GUI. The result ratio is based on a primary query, which returned 90 rows from a database table that contains a total of 144 rows. A portion of the 90 rows returned is displayed in a tabular display area 420. By performing an action on the pie chart in graphical representation 220, a user can toggle display 400 between displaying selected rows and displaying unselected rows. In one example implementation, a complementary query can be constructed at the time when a user creates the primary query. The complementary query is stored on a storage device. In another example implementation, a complementary query can created when a user interacts with the pie chart in graphical representation 220. The user interaction can be clicking on the pie chart, hovering on the pie chart, selecting the pie chart from a menu item, etc.

FIG. 4B is an example display 450 of data not selected by a primary query. Upon receiving a user action on graphical representation 220, a complementary query is executed. The complementary query is the new primary query in display 450. In display 450, a graphical representation 460 of a result ratio is shown. Graphical representation 460 can contain a pie chart, which represents the result ratio. The pie chart can be one of many control components in a GUI. The result ratio is based on the new primary query, which returned 54 rows from a database table that contains a total of 144 rows. In some implementations in which the database table is locked, the result ratio 54/144 is complementary to the result ratio 90/144 in the result set of the original primary query. In some other implementations in which the database table is not locked, the numbers showing in graphical representation 460 may not be complementary to the result ratio 90/144 in the result set of the original primary query. A portion of the 54 rows returned is displayed in a tabular display area 470. By interacting with the pie chart in graphical representation 460, a user can toggle display 450 between displaying rows selected by a primary query and rows selected by a complementary query.

Example Architecture

Figure 5:
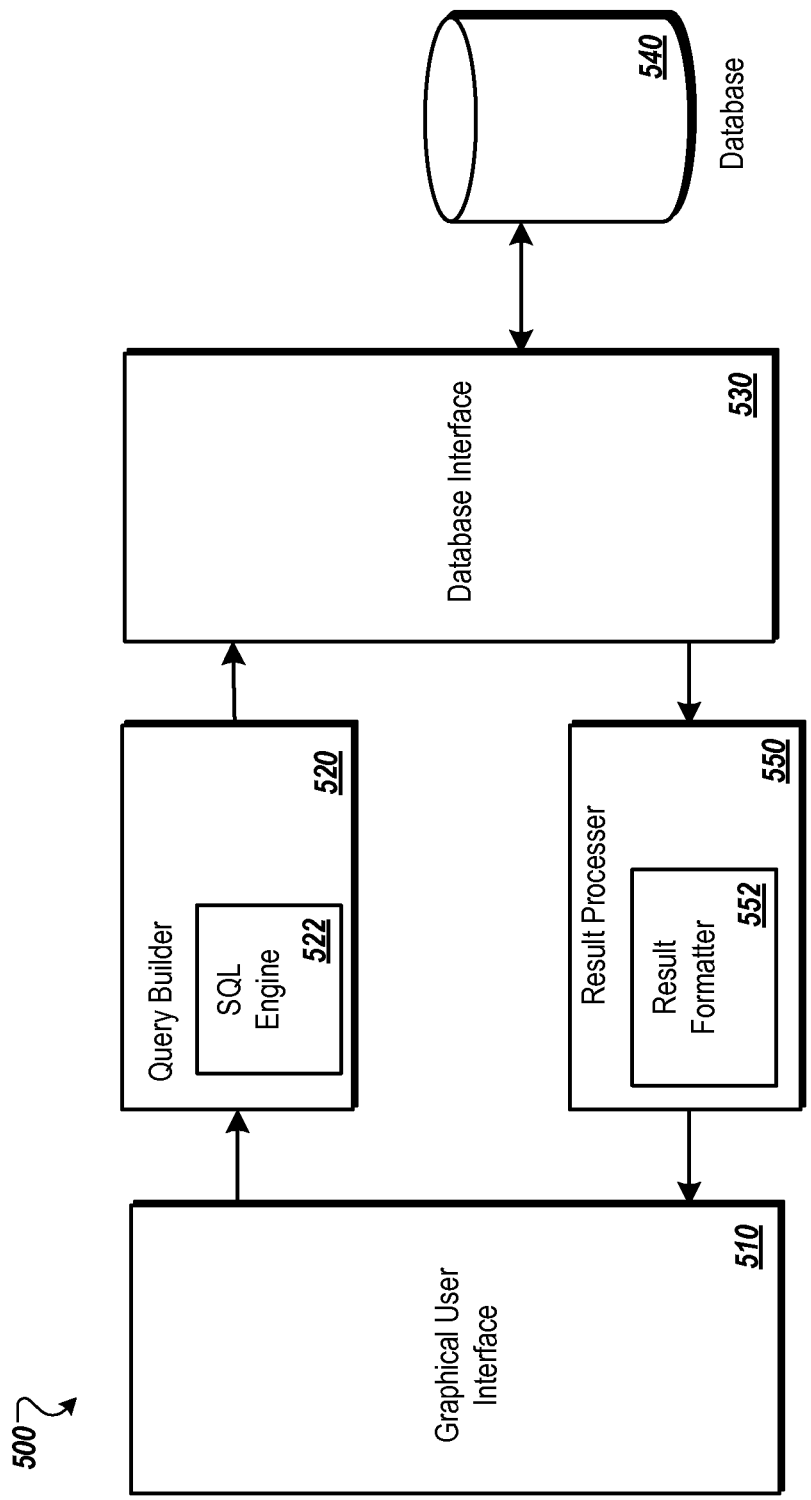
FIG. 5 illustrates an example architecture of a database-backed application development tool.

FIG. 5 illustrates an example architecture 500 of a database program. Database engine 540 can contain a SQL based data source. Database 540 is not required to be a homogeneous database system running on a single database server. Database 540 can be run on multiple servers and can include commercial and Open Source databases.

A database interface 530 can communicate with database 540. Database interface 530 can be an Application Programming Interface ("API") that defines how a database client may access database engine 540. Database interface 530 provides methods for querying and updating data in database 540. Database interface 530 can contain database drivers that contain specific details with regard to the database 540. Examples of database interface 530 can be database-specific API such as TransactSQL, language-specific API such as Java Database Connectivity ("JDBC"), or standard procedural API such as Open Database Connectivity ("ODBC"). In particular, a database program can use ODBC drivers to share data as a data source and to interact with data from other applications, such as a client application. Database interface 530 can implement functions that translate queries in standard query language such as SQL into database specific instructions, and functions that create one or more result sets based on the rows returned from the database. Database interface 530 can implement functions that translates queries in standard query language such as SQL into database specific instructions, and functions that create one or more result sets based on the rows returned from the database.

A SQL engine 522 can generate SQL statements to be passed to database interface 530. SQL engine 522 can be part of a query builder 520. The query builder 520 can allow a user to choose a data source, to select one or more tables from data source to query, to specify a table to be a current table, and to specify which column in the selected tables to retrieve in a result set. The query builder 520 can also accept a SQL statement that is provided by a user. In response to a user command, the query builder 520 can execute a query immediately, or store a query in a field for repeated use. The query builder 520 can execute a query by sending a SQL query statement or a parameterized SQL command to a database interface component.

In some implementations, the query builder 520 can be configured to create more than one SQL statements through SQL engine 522. For example, the query builder 520 can be configured to create a primary query based on a user's selection of data source, table, column, and selection criteria. The query builder 520 can be configured to create a summary query when a user creates a primary query. The query builder 520 can be configured to parse a primary query and generate a complementary query based on an analysis of the primary query. An analysis of the primary query can include identifying a current table, parsing a SQL statement, and composing a new SQL statement by inserting operators in the primary SQL statement or building a nested SQL statement. The query builder 520 can be configured to group a primary query, a summary query, and a complementary query into a query group. To prevent security attacks on the database by SQL injections, a query builder 520 can contain a filtering mechanism to remove control sequences in a primary query, especially when a primary query was entered by a user directly into a query builder, instead of using the database programs GUI.

A graphical user interface ("GUI") 510 can be used to allow a user to interact with the query builder 520. The user interface 510 can list available data sources in a system. The user interface 510 can graphically display tables in a data source after a user selects a data source. The user interface 510 can graphically link tables according to the tables' primary keys and foreign keys. The user interface 510 can allow a user to select tables and columns to be queried in a SQL statement. The user interface 510 can allow a user to graphically linking two tables to create a select statement that requires joining two or more tables. Conversely, if a user directly types in a SQL query, the user interface 510 can graphically display relationships between tables in the user's SQL query, based on an analysis by the query builder 520.

A result processor 550 can process one or more result sets returned from the database interface 530 after a query is executed. The processing can include populating a data structure with data returned from the database interface 530, and formatting the data returned from the database interface 530 by a result formatter 552. Populating a data structure with data returned from the database interface 530 can include assembling a data structure that contains a total number of rows in a table, the number of rows in a result set, and the actual rows in a result set. The assembling can be achieved by caching result set of a query in query group in a result cache for the query group, and assemble result sets in the cache after all queries in the query group have been executed and all result sets have been retrieved. The result formatter 552 can create graphical representations of result sets, for example, pie charts, bar charts, or eye charts.

The user interface 510 can display various display items, such formatted result sets, or user controls for executing a query, storing a query, or importing/exporting a query. A display item can be both a query result and a control at the same time. For example, the user interface 510 can contain a graphical representation of a result ratio 210, 220, 230, 310, or 320, which also acts as a control with which a user can interact.

Example System

Figure 6:
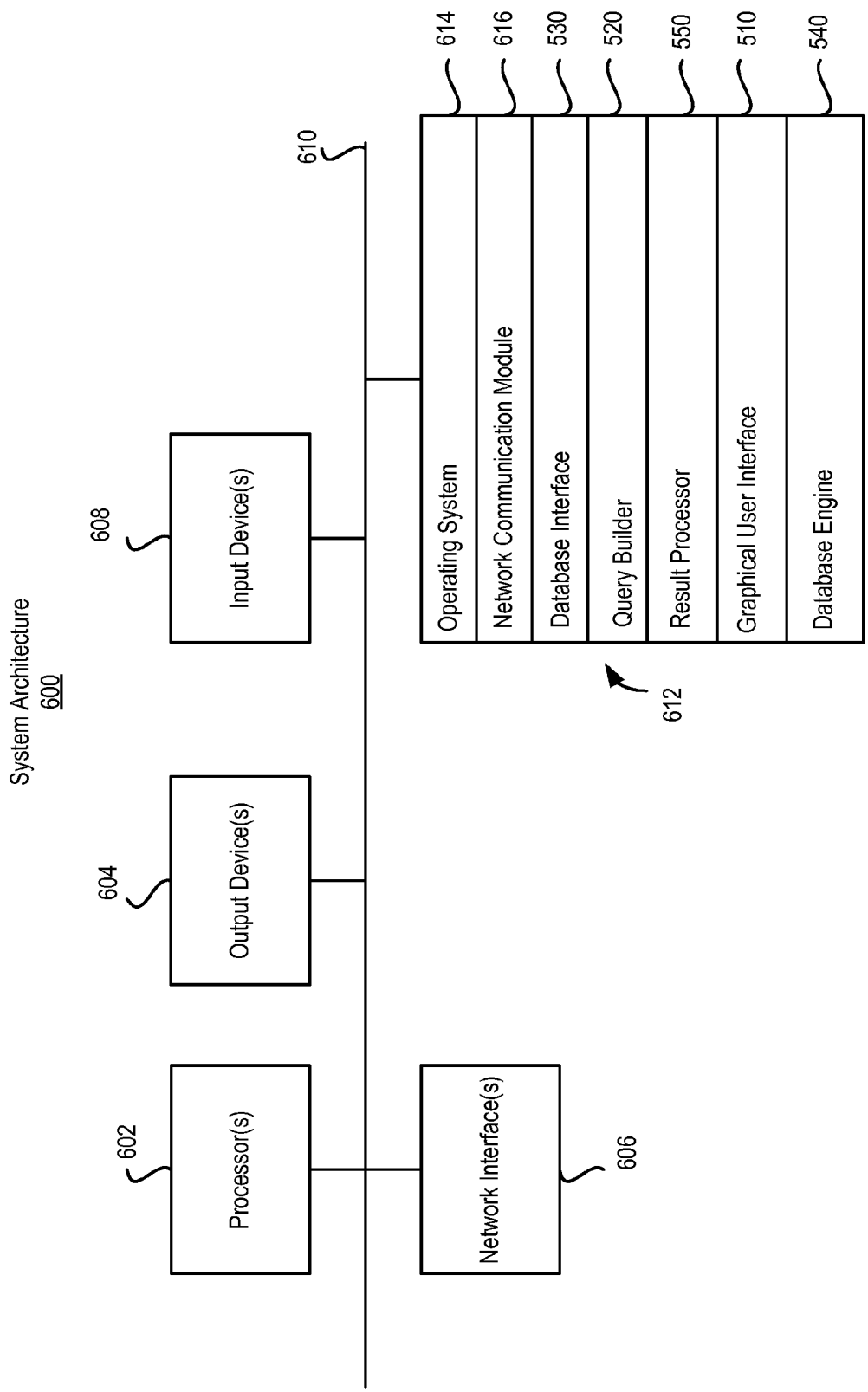
FIG. 6 illustrates an example computer system for implementing the features and operations as described in reference to FIGS. 1-5.

FIG. 6 is a block diagram of a system architecture 600 for implementing the features and operations described in reference to FIGS. 1-5. Other architectures are possible, including architectures with more or fewer components. In some implementations, the architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more computer-readable mediums 612 (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "computer-readable medium" refers to any medium that participates in providing instructions to a processor 602 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 612 further includes an operating system 614 (e.g., Mac OS® server, Windows® NT server), a network communication module 616, database interface 530, a query builder 520, a result processor 550, a graphical user interface 510, and a database engine 540. The operating system 614 can be multi-user, multiprocessing, multitasking, multithreading, real time, etc. The operating system 614 performs basic tasks, including but not limited to: recognizing input from and providing output to the devices 606, 608; keeping track and managing files and directories on computer-readable mediums 612 (e.g., memory or a storage device); controlling peripheral devices; and managing traffic on the one or more communication channels 610. The network communications module 616 includes various components for establishing and maintaining network connections (e.g., software for implementing communication protocols, such as TCP/IP, HTTP, etc.).

The architecture 600 is one example of a suitable architecture for hosting a database program or an application development program. Other architectures are possible, which include more or fewer components. The architecture 600 can be included in any device capable of hosting a database program or an application development program. The architecture 600 can be implemented in a parallel processing or peerto-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. Accordingly, other implementations are within the scope of the following claims.

What is claimed is:

1. A computer-implemented method, comprising:
   receiving a result set and a total number of rows from a database in response to a database query;
   providing a control displaying a first graphical representation of a result ratio between a row count of the result set and the total number of rows, the first graphical representation including a first portion representing the row count of the result set and a second portion representing a row count of rows outside of the result set, wherein a ratio between a size of the first portion and a size of the first portion plus the second portion represents the result ratio;
   receiving input in response to user interaction with the control; and
   responsive to the input:
      parsing, by a query builder, the database query;
      generating, by the query, a complementary query in response to the parsing;
      executing the complementary query generated by the query builder;
      receiving a complementary result set of the complementary query; and
      providing for display on a display device the control displaying a second graphical representation, the second graphical representation representing a result ratio between a row count of the complementary result set and the total number of rows.

2. The method of claim 1, wherein providing the control comprises:
   receiving a total table row count;
   receiving a result set row count or a complement result set row count;
   calculating a result ratio between one of:
      the result set row count and the total table row count, or
      the complement result set row count and the total table row count; and
   generating a control based on the result ratio for display in a graphical user interface.

3. The method of claim 2, wherein generating the control comprises dynamically creating a control graph based on the result ratio.

4. The method of claim 2, wherein generating the control comprises selecting a control graph from a set of prior-created control graphs based on the result ratio.

5. The method of claim 4, wherein the control graph is one of a pie chart, a bar chart, or an eye chart.

6. The method of claim 1, wherein providing the control displaying the second graphical representation of the result ratio comprises:
   toggling the first portion of the first graphical representation and the second portion of the first graphical representation such that the size of the first portion corresponds to the row count of rows outside of the result set and the size of the second portion corresponds to the row count of the result set.

7. The method of claim 2, wherein providing the control displaying the first graphical representation of the result ratio comprises manipulating a part of an image file without generating the entire image file.

8. The method of claim 1, wherein providing the control displaying a second graphical representation of the result ratio comprises:
   providing for display at least a portion of the complementary result set of the complementary query in association with the control.

9. The method of claim 8, wherein the complementary query comprises a query for returning a row of data not selected by the database query.

10. The method of claim 1, wherein providing the control displaying a second graphical representation of the result ratio comprises:
   locating rows of the complementary result set in a result processor; and
   displaying the rows of the complementary result set.

11. The method of claim 1, wherein providing the control displaying a second graphical representation further comprises locking the result set.

12. The method of claim 11, wherein locking the result set comprises setting the result set to a read-only status in a result processor.

13. The method of claim 11, wherein locking the result set comprises locking a database table.

14. The method of claim 1, wherein the second graphical representation of the result ratio is a graphical representation of a complementary result ratio.

15. The method of claim 1, wherein the input is a user action on the control.

16. A non-transitory computer-readable medium storing a computer program which, when executed by a computer processor, causes the computer processor to perform operations comprising:
   receiving a result set and a total number of rows from a database in response to a database query;
   providing a control displaying a first graphical representation of a result ratio between a row count of the result set and the total number of rows, the first graphical representation including a first portion representing the row count of the result set and a second portion representing a row count of rows outside of the result set, wherein a ratio between a size of the first portion and a size of the first portion plus the second portion represents the result ratio;
   receiving input in response to user interaction with the control; and
   responsive to the input:
      parsing, by a query builder, the database query;
      generating, by the query, a complementary query in response to the parsing;
      executing the complementary query generated by the query builder;
      receiving a complementary result set of the complementary query; and
      providing for display on a display device the control displaying a second graphical representation, the second graphical representation representing a result ratio between a row count of the complementary result set and the total number of rows.

17. The computer-readable medium of claim 16, wherein providing the control comprises:
   receiving a total table row count;
   receiving a result set row count or a complement result set row count;
   calculating a result ratio between one of:
      the result set row count and the total table row count, or
      the complement result set row count and the total table row count; and
   generating a graph based on the result ratio; and
   generating a control based on the result ratio for display in a graphical user interface.

18. The computer-readable medium of claim 17, wherein generating the control comprises dynamically creating a control graph based on the result ratio.

19. The computer-readable medium of claim 17, wherein the generating the control comprises selecting a control graph from a set of prior-created control graphs based on the result ratio.

20. The computer-readable medium of claim 19, wherein the control graph is one of a pie chart, a bar chart, or an eye chart.

21. The computer-readable medium of claim 16, wherein providing the control displaying the second graphical representation of the result ratio comprises:
   toggling the first portion of the first graphical representation and the second portion of the first graphical representation such that the size of the first portion corresponds to the row count of rows outside of the result set and the size of the second portion corresponds to the row count of the result set.

22. The computer-readable medium of claim 17, wherein providing the control displaying the first graphical representation of the result ratio comprises manipulating a part of an image file without generating the entire image file.

23. The computer-readable medium of claim 16, wherein providing the control displaying a second graphical representation of the result ratio comprises:
   providing for display at least a portion of the complementary result set of the complementary query in association with the control.

24. The computer-readable medium of claim 23, wherein the complementary query comprises a query for returning a row of data not selected by the database query.

25. The computer-readable medium of claim 16, wherein providing the control displaying a second graphical representation of the result ratio comprises:
   locating rows of the complementary result set in a result processor; and
   displaying the rows of the complementary result set.

26. The computer-readable medium of claim 16, wherein toggling between displaying the result set and data not in the result set further comprises locking the result set.

27. The computer-readable medium of claim 26, wherein locking the result set comprises setting the result set to a read-only status in a result processor.

28. The computer-readable medium of claim 26, wherein locking the result set comprises locking a database table.

29. The computer-readable medium of claim 16, wherein the second graphical representation of the result ratio is a graphical representation of a complementary result ratio.

30. The computer-readable medium of claim 16, wherein the input is a user action on the control.

31. A system comprising:
   a processor;
   memory coupled to the processor and operable for storing instructions, which, when executed by the processor, causes the processor to perform operations comprising:
      receiving a result set and a total number of rows from a database in response to a database query;
      providing a control displaying a first graphical representation of a result ratio between a row count of the result set and the total number of rows, the first graphical representation including a first portion representing the row count of the result set and a second portion representing a row count of rows outside of the result set, wherein a ratio between a size of the first portion and a size of the first portion plus the second portion represents the result ratio;
      receiving input in response to user interaction with the control; and
      responsive to the input:

parsing, by a query builder, the database query;
generating, by the query, a complementary query in response to the parsing;
executing the complementary query generated by the query builder;
receiving a complementary result set of the complementary query; and
providing for display on a display device the control displaying a second graphical representation, the second graphical representation representing a result ratio between a row count of the complementary result set and the total number of rows.

32. The system of claim 31, wherein providing the control comprises:
receiving a total table row count;
receiving a result set row count or a complement result set row count;
calculating a result ratio between one of:
the result set row count and the total table row count, or
the complement result set row count and the total table row count; and
generating a control based on the result ratio for display in a graphical user interface.

33. The system of claim 32, wherein generating the control comprises dynamically creating a control graph based on the result ratio.

34. The system of claim 32, wherein the generating a control comprises selecting a control graph from a set of prior-created control graphs based on the result ratio.

35. The system of claim 34, wherein the control graph is one of a pie chart, a bar chart, or an eye chart.

36. The system of claim 31, wherein providing the control displaying the second graphical representation of the result ratio comprises:
toggling the first portion of the first graphical representation and the second portion of the first graphical representation such that the size of the first portion corresponds to the row count of rows outside of the result set and the size of the second portion corresponds to the row count of the result set.

37. The system of claim 32, wherein providing the control displaying the first graphical representation of the result ratio comprises manipulating a part of an image file without generating the entire image file.

38. The system of claim 31, wherein providing the control displaying a second graphical representation of the result ratio comprises:
providing for display at least a portion of the complementary result set of the complementary query in association with the control.

39. The system of claim 38, wherein the complementary query comprises a query for returning a row of data not selected by the database query.

40. The system of claim 31, wherein providing the control displaying a second graphical representation of the result ratio comprises:
locating rows of the complementary result set in a result processor; and
displaying the rows of the complementary result set.

41. The system of claim 31, wherein providing the control displaying a second graphical representation further comprises locking the result set.

42. The system of claim 41, wherein locking the result set comprises setting the result set to a read-only status in a result processor.

43. The system of claim 41, wherein locking the result set comprises locking a database table.

44. The system of claim 31, wherein the second graphical representation of the result ratio is a graphical representation of a complementary result ratio.

45. The system of claim 31, wherein the input is a user action on the control.

* * * * *